Patented Sept. 4, 1951

2,566,851

UNITED STATES PATENT OFFICE 2,566,851

PHENOLIC INTERCONDENSATION RESINS AND METHODS OF MAKING SAME

Ernest E. Novotny, Philadelphia, and George K. Vogelsang, La Mott, Pa., assignors to The Borden Company, New York, N. Y., a corporation of New Jersey No Drawing. Application December 3, 1947, Serial No. 789,565

8 Claims. (Cl. 260—56)

This invention relates to phenolic inter-condensation resins of the permanently fusible or Novolak type, and to methods for making such resins.

Prior to this invention, it was not considered feasible to produce phenolic furane-aldehyde-non-furane-aldehyde inter-condensation resins of the so-called permanently fusible or Novolak type. This was due in large measure to the circumstance that there is no one class of catalyst that is suitable in preparing such an inter-condensation product of the permanently fusible type when the usual proportions of phenol to total aldehydes are utilized. In the commercial production of phenol-formaldehyde resins of the Novolak type an acidic catalyst is used, whereas in the case of the commercial production of phenol-furfural resins a mildly alkaline catalyst is used. If an attempt is made to resinify a mixture of phenol, formaldehyde and furfural in the presence of an acidic catalyst, utilizing the usual ratio of phenol to total aldehyde, the acid attacks the furfural in much the same manner as if the phenol and formaldehyde were not present, resulting in a profound decomposition of the furfural. If, on the other hand, it is attempted to resinify the same mixture of reagents in the presence of an alkaline catalyst, the product upon dehydration either turns rubbery or infusible, thus precluding the production of a permanently fusible resin in the grindably hard state, or a resin of the potentially reactive or single-stage type results.

An object of the present invention is to provide a commercially practical method of manufacturing the permanently fusible type of resin from a mixture comprising a furane-aldehyde, a non-furane-aldehyde and a phenol.

Another object of the invention is to provide an entirely new class of phenolic inter-condensation resins that differ characteristically both in properties and in range of useful applications from the usual phenol-formaldehyde resins, phenol-furfural resins, or physical mixtures thereof.

Another object is to provide resins derived from furane-aldehydes which are possessed of a lighter color than those previously obtainable from this type of aldehyde.

Still another object is to provide resins from furane-aldehydes which are characterized by a more rapid rate of cure for a given "flow" or vice versa by being possessed of a greater "flow" for a given rate of cure.

Other objects and advantages will be pointed out as the description proceeds.

It is not practical to produce inter-condensation resins by reacting a mixture of phenol, formaldehyde and furfural in the presence of an acid catalyst because the acid attacks and decomposes too much of the furfural. When an attempt is made to carry out the reaction in the presence of an alkaline catalyst, using the usual proportions of phenol to formaldehyde, the results are equally unsatisfactory, owing to the fact that after some phenol-aldehyde condensation products have been formed some of the remaining free aldehyde tends to react with this already formed condensation product to yield large complexes which are in effect potentially reactive resins or which become gels and partake of the nature of a "B" or "C" stage resin, depending on how far the reaction has progressed.

The present invention is based upon the observation that if a substantial excess of phenol is used in the reaction and if an alkaline catalyst is used the undesired reactions just referred to are prevented. The explanation for this resides very likely in the fact that as the ratio of phenol to aldehyde is increased the possibility of an aldehyde molecule reacting with a phenol molecule is so increased in relation to the possibility of such an aldehyde molecule reacting with an already formed phenol-aldehyde condensation product that no appreciable quantity of over-reacted phenol-aldehyde condensation product comes into being. The excess phenol also exerts a diluting effect in that it tends to diminish the concentration of the free aldehyde.

Briefly stated, the method of the invention comprises the steps of reacting a mixture containing a furane-aldehyde, a non-furane-aldehyde, a phenol and an alkaline catalyst, the aldehyde being present in a molar furane-aldehyde to non-furane-aldehyde ratio of from 1:10 to 10:1, and the molar ratio of total phenol to total aldehydes being not less than 1.3:1, and then distilling off volatiles including water of reaction and excess phenol. The resulting resins are essentially of the so-called permanently fusible or Novolak type.

It is important to note that in carrying out the teachings of the present invention, at least two aldehydes are required, one of which is a "furane-aldehyde" and the other a "non-furane-aldehyde."

The term "furane-aldehyde" is intended to cover all aldehydes wherein the characteristic aldehyde group is linked to a heterocyclic "furane" structure. The preferred furane-aldehyde is furfural, but it is within the purview of the present invention to use the alkyl furane aldehydes such as methyl furfural and ethyl furfural.

Derivatives of the furane-aldehyde which do not contain the aldehyde group cannot be considered as the equivalents of furane-aldehydes for the purposes of the present invention. Materials such as furfurylidene ethylamine (procured by reacting furfural with ethyl amine) or furfuramid (procured by reacting furfural with ammonium hydroxide) or furfurin (prepared from furfuramid by heating it to 110° C. or treating it with dilute alkali or dissolving it in liquid ammonia), are capable of reacting with phenol under suitable conditions to form resinous materials, but the resultant nitrogen-containing resins are chemically and physically distinct from the straight furfural-phenol condensation products.

In this connection, it is important to note that the present invention is concerned with the production of "inter-condensation resins." In these resins the average molecule simultaneously contains structures derived from furane-aldehydes and non-furane-aldehydes. As far as the inventors have been able to ascertain, the first reactions that occur comprise the formation of relatively simple condensation products out of phenol and the non-furane-aldehyde on the one hand, and phenol and the furane-aldehyde on the other. In the course of the subsequent reaction these relatively simple molecules more or less inter-condense with one another to form resins of the so-called permanently fusible or Novolak class, each average molecule of which contains structures which can be traced back to both types of aldehyde.

Inasmuch as materials such as furfuramid, furfurin, furfurylidene ethylamine, furfurylidene methylamine, etc., do not function as the equivalents of the furane-aldehydes, cognizance should be taken of the fact that the reaction mixture should not contain mixtures which upon reaction engender the above indicated unsuitable types of compounds. Thus if to a mixture containing furfural there be added ammonia, the ammonia almost immediately reacts with the furfural to form furfuramid (some of the ammonia may react with equal facility with any non-furane-aldehyde present, e. g., formaldehyde to form hexamethylene-tetramine). It consequently follows that if the quantity of ammonia added to a reaction mixture containing furfural is sufficient to convert all of the furfural present over to furfuramid the essential products of the present invention will not be formed.

It is interesting to note that when phenol is reacted with formaldehyde in the presence of furfuramid or a mixture of furfural and ammonia as the "catalyst" the resultant resin is essentially a phenol-formaldehyde resin wherein the furfuramid to all intents and purposes remains unreacted upon and may advantageously be left in the mass to function as a "hardening agent" when the resin is subjected to curing temperatures. Furfuramid does not function satisfactorily as a catalyst for the production of the "inter-condensation" type of resin.

The term "non-furane-aldehyde" is used for want of a better term and is intended to embrace all suitable substances belonging to the class of compounds commonly referred to as "aldehydes," excluding, however, the "furane-aldehydes" which have been alluded to in the foregoing paragraph. The "non-furane-aldehydes" may be aliphatic, carbocyclic or heterocyclic in character. Included among the non-furane-aldehydes which we have found to be particularly suitable may be mentioned formaldehyde, acetaldehyde, propionaldehyde, butyraldehyde, isobutyraldehyde, benzaldehyde, and the substituted aldehydes, such as meta chlor benzaldehyde as well as the aldoles and their simple ploymerization products such as paraformaldehyde, paraacetaldehyde, etc. The preferred non-furane-aldehyde is formaldehyde.

These described aldehydes are free of reactive substituents.

The reaction mixture may contain more than one "furane-aldehyde" and/or more than one "non-furane-aldehyde." The essential requirement is that the reaction mixture contain at least one furane-aldehyde and at least one species of non-furane-aldehyde.

The ratio of furane-aldehyde to non-furane-aldehyde may be varied within very wide limits, provided substantial proportions of both types of aldehydes are used. Either type may be present in predominating quantities, as will be seen from the illustrative examples. In order to obtain resins which exhibit the unique characteristics of the present invention, it is recommended that the aldehydes be present in a molar furane-aldehyde; non-furane-aldehyde ratio of from 1:10 to about 10:1.

By the term "a phenol," we intend to include all substances commonly recognized as belonging to the class of "phenols"—such compounds being functionally characterized in that they contain one or more phenolic groups, i. e. (OH) groups attached to an aromaticized portion of a cyclic structure. In general, the crystallizable phenols of aromatic hydrocarbons and of substituted aromatic hydrocarbons are suitable for the purposes of the invention. As examples of suitable phenols may be mentioned the monohydric phenols including carbolic acid (phenol, $C_6H_5OH$), the cresols, cresylic acid, the xylenols and the naphthols, the dihydric phenols including catechol and resorcinol, the trihydric phenols including pyrogallol and phloroglucinol, and substituted phenols containing an element or grouping such as halogen, an amine group, a nitro group or a carboxyl group attached directly to the aromatic ring in addition to one or more reactive hydroxyl groups. As additional examples of suitable phenols may be mentioned naturally occurring substances such as gum accroides, dragon's blood and cashew nut shell liquid, and their derivatives containing reactive hydroxyl groups. The reaction mixture may contain one or more phenols, it being essential that the reaction mixture contain at least one phenol.

To produce inter-condensation resins according to the present invention it is necessary that not less than 1.3 moles of phenol be utilized per mole of total aldehyde. In the preferred embodiments of the invention approximately 1.60 moles of total phenol are utilized per mole of total aldehydes.

There does not appear to be any critical upper limit to the molar excess of phenol that may be utilized for reaction. However, from the standpoint of the economics and the structural parameters of the equipment involved, it is desirable to keep the excess as small as possible inasmuch as the excess ties up capital, involves the use of larger processing kettles, and consumes added quantities of heat for the purpose of distilling it out so as to permit of isolating the resin. Furthermore the use of an unnecessarily large excess of phenol entails extra work and expense in its recovery. Upon the basis of numerous tests the inventors have ascertained that there is no advantage in utilizing a molar ratio of total phenol to total aldehydes greater than 1.75 to 1. In the light of these facts, it is recommended that between 1.3 and 1.75 moles of phenol per mole of total aldehyde be used. The preferred proportion is approximately 1.6 moles of phenol per mole of total aldehyde.

Non-phenols that enter into ready reaction with aldehydes should be precluded from the reaction mixture. If a material such as urea were included in the mixture it would be found that the same reacts with the formaldehyde with great rapidity, giving rise to urea-formaldehyde condensation products. If such a reaction mixture is processed in the usual manner, it will be found that resinous end products are procured but these products will not be the equivalent of and will differ in many respects from the inter-condensation products of the present invention.

The reaction should be carried out in the presence of an alkaline catalyst. By the term "alkaline catalyst," the inventors have reference to all substances which in aqueous solution give an alkaline or basic reaction. Among the preferred materials for use in the present invention are the hydroxides, carbonates and bicarbonates of the alkali metals, i. e., cesium, rubidium, lithium, potassium and sodium. The oxides and hydroxides of the alkaline earth metals, i. e., barium, strontium, calcium and magnesium are also usable though they are not nearly as effective as the alkaline metal compounds. In this group barium hydroxide is the most satisfactory. Appropriate organic nitrogen-containing bases are suitable for use as catalysts, though they are not particularly recommended because even the best of them are much less satisfactory than the preferred inorganic compounds above mentioned. In some instances it is advantageous to utilize a mixture of catalysts, e. g., potassium carbonate, plus triethanolamines. Upon the basis of many experimental runs, it has been found that from an all-around standpoint, potassium carbonate is the most satisfactory catalyst.

The alkaline catalyst used should be of the fixed or the substantially non-volatile type so that its concentration in the reacting mass is fairly constant. Readily volatile organic materials such as ammonia and the more volatile organic amines are not recommended for use in the present invention because (1) owing to their ready volatility they are gradually eliminated from the reacting mass, (2) these materials are catalytically much weaker than the preferred types of catalyst indicated in the preceding paragraph, (3) most of these materials enter into reaction with the formaldehyde or furane-aldehyde per se, e. g., to form hexamethylenetetramine, furfuramid, etc., and for this reason these materials are precluded from reacting after the manner of a material such as potassium hydroxide or potassium carbonate.

In carrying out the method of the present invention, recourse may be had to a wide range of manipulative processing technique. Thus, after the ingredients have been thoroughly mixed, the admixture may be refluxed to bring about an initial tie-up between the phenol and the aldehydes. The refluxing period may be varied between fairly wide limits, the minimum necessary time depending upon the excess of phenol, type of catalyst and quantity of catalyst. Thus the refluxing period may be as short as thirty minutes or as long as ten hours. Generally speaking, the greater the time of refluxing the greater the yield of end product. The refluxing step may be omitted, and the initial tie-up between the phenol and the aldehydes brought about by other means such as a slow distillation.

After the reagents have been initially tied up by refluxing or slow distillation, the charge is subjected to a distillation operation for the purpose of driving off the original water, the water of reaction, and substantially the entire excess of phenol. The distillation may be carried out under a variety of conditions. Thus, either the rate of distillation or the pressure under which it is carried out or both the rate and pressure may be varied between fairly wide limits. For instance, the distillation may be carried out at a rapid pace or at a very slow rate, at atmospheric pressure or above or below atmospheric pressure.

A permissible variation consists in carrying out the distillation in stages, e. g. the distillation may be carried out in two stages, the first at atmospheric pressure and the second stage below atmosphere. It has been found advantageous to blow or draw a current of air, steam or other gas through the reaction kettle during the last part of the distillation step to expedite the expulsion of the excess phenol.

At this point, it is to be noted that, generally speaking, the manipulative procedure influences the yield of product. Thus, longer reflux periods and the carrying out of part of the distillation at atmospheric pressure or above usually results in a greater yield of resin. Carrying out part of the distillation at or above atmospheric pressure also facilitates the driving off of the bulk of the water, thereby rendering it easier to isolate and recover the excess phenol. As has been stated, the step of recovering the phenol may be considerably expedited by blowing or drawing a current of gas through the reaction kettle during the latter stage of the distillation step.

It is also to be noted that the manipulative procedure also influences to a certain extent the physical characteristics of the final product. The fully reacted products are grindably hard resins of the Novolak (permanently fusible) type. If the process is not carried to completion, the product is either fluid or semi-fluid, due very likely to the presence of unreacted components such as phenols, aldehydes, etc. The soft resins may be obtained by curtailing either the refluxing or distillation step or both. If it is desired to obtain a product of a desired degree of hardness, it is merely necessary to remove a sample from time to time during the distillation step and permit it to cool. When the cooled sample exhibits the desired degree of hardness, the distillation is stopped. The hard resins may be converted to soft or to liquid resinous substances by mixing with various solvents.

As has been stated, the excess of phenol is removed from the resinous reaction mass by distillation. The phenolic material removed in this manner usually contains an appreciable quantity of water, unreacted aldehydes, etc. It is generally not necessary to remove all the water or the aldehyde as the phenolic material may be added as is to the next charge. In such case, the bulk of the additional water may be removed in the next processing by carrying out the first stage of the distillation at atmospheric pressure. If desired, all or part of the water may be removed from the phenolic material before it is roused. In the case of a water-insoluble phenol, the separation may be accomplished by simple decantation. In the case of a water-soluble phenol, the separation may be accomplished by distillation, extraction or freezing.

Because of the fact that the reaction is carried out under alkaline conditions, the resultant resin is strongly basic. The basicity may be considerably reduced or entirely neutralized by adding an acid before the resin is poured and continuing the heating for a short time. The resin may be made more or less acid in the same manner. The acid for the purpose may advantageously be salicylic acid.

The present invention, revolving as it does around the production of permanently fusible or Novolak resins of the inter-condensation type out of furane-aldehydes, non-furane-aldehydes and phenols, has its counter-part in the production of potentially reactive resinous materials (non-Novolak type) out of similar ingredients according to the teachings of U. S. Letters Patent 1,771,508 granted to one of the co-inventors of the present invention. In said prior patent, it will be observed that the molar ratio of phenol to formaldehyde is kept below the minimum usable ratio which is disclosed as being necessary in carrying out the present invention. It is thus seen that by utilizing a low ratio of phenol to total aldehyde, potentially reactive resins are obtained, whereas by the use of a higher ratio as is disclosed in this specification, resins of the permanently fusible or Novolak type are obtained.

The present invention differs from the prior art in numerous respects. In the first place it will be recognized that the inventors utilize a quantity of phenol which is substantially in excess of the quantity which is commonly utilized in the resin industry for the production of Novolak resins. It has been determined by experimentation and through actual manufacturing experience extending over a period of many years that the molar ratio of phenol to formaldehyde for the production of a Novolak type of phenol-formaldehyde resin should be in the range of 1.0 to 1.2 moles of phenol per mole of formaldehyde and in the ordinary, common or "normal" quantity of phenol utilized by the industry is in the middle of this range, at about 1.1 mole of phenol per mole of formaldehyde. It is a common practice not to deviate from these proportions by more than a few per cent. In the case of the permanently fusible resins of the phenol-furfural type, it is a common practice to utilize between 1.1 and 1.2 moles of phenol per mole of furfural. The inventors have found that for the production of their inter-condensation resins the absolute minimum ratio of phenol to formaldehyde (on a molar basis) should be 1.3.

In the production of phenol-formaldehyde resins of the permanently fusible or Novolak type, it is the common practice to utilize an acid catalyst. The use of alkaline catalysts for the productions of phenol-formaldehyde resins of the Novolak type is purely of academic interest, owing to the various attendant difficulties in producing such resins in this manner. Furthermore, it is to be noted that when an alkaline catalyst is used it is generally of the volatile type such as ammonia, whereas the inventors caution against the use of this type of catalyst for the production of their inter-condensation products. Also it is to be observed that in the production of phenol-formaldehyde Novolak resins via the use of a volatile base catalyst, not less than 13 moles of phenol per 7 moles of formaldehyde must be utilized, corresponding to a ratio of 1.86 moles of phenol per mole of formaldehyde. By contrast the inventors have discovered that in the production of their inter-condensation product they do not have to utilize such a high ratio of phenol to formaldehyde and indeed may utilize a ratio of 1.3 moles of phenol per mole of total aldehydes, with a preferred ratio of approximately 1.6 moles of phenol per mole of total aldehydes. It is further to be observed that in the production of phenol-formaldehyde Novolak resins via the use of a volatile base catalyst one actually first produces a heat-hardenable resin which on further reaction undergoes transformation into a Novolak during which time virtually the whole of the volatile base escapes from the reaction mass. In such a process the Novolak resin is produced not directly from the phenol and the formaldehyde, but from a heat-hardenable resin. All these complications are avoided in the present invention. It is to be further observed that in the production of phenol-formaldehyde Novolak resins via the use of a volatile organic base catalyst specific types of equipment must be provided, e. g., an air-cooled ascension type is considered necessary. The use of such specially designed equipment is unnecessary in carrying out the process of the present invention.

The following examples are given by way of illustration:

EXAMPLE I

Materials

| | Parts |
|---|---|
| Technical phenol (83% $C_6H_5OH$) | 150 |
| Furfural ($C_4H_3OCHO$) | 75 |
| Formaldehyde | 25 |
| Potassium carbonate | 3 |

Procedure

The materials were mixed and refluxed. As has been stated, the length of the refluxing period may be varied between fairly wide limits, the minimum necessary time depending upon the excess of phenol and the particular catalyst and quantity thereof. For the given proportions of material, the mixture may be refluxed as little as one hour or as long as 6 hours, the longer time giving a somewhat greater yield of end product. In the present example, the mixture was refluxed for two hours.

The charge was then subjected to a distillation operation for the purpose of driving off the original water, the water of reaction and substantially the entire excess of phenol. As the distillation proceeded, the temperature was permitted to rise until the mass attained a temperature of about 350° F. under a vacuum of 22 inches. This temperature was maintained for a sufficient time to produce a desirable degree of hardness in the end product. A distillation time of between 1 and 2 hours has been found to be suitable for most practical purposes. In the present example, the distillation time was about two hours.

Product

The product of this example was a grindably hard resin of the Novolak (permanently fusible) type.

EXAMPLE II

Materials

| | Parts |
|---|---|
| Technical phenol (83% C₆H₅OH) (50% excess) | 20.37 |
| Furfural (1.75 moles) | 7.50 |
| Formaldehyde (1.00 mole) | 3.564 |
| Potassium carbonate | 0.40 |

Procedure

The materials were admixed, refluxed for about two hours and then dehydrated under a vacuum of about 23 inches, ending up with a residuum temperature of about 375° F. This temperature was maintained until the product became grindably hard.

Product

A yield of 19.64 parts of a grindably hard resin of the permanently fusible type was obtained. The resin had a capillary tube melting point of 143° F., a solids content of 95.3% and a pH of 9.31.

EXAMPLE III

Materials

The same as in Example II with the exception that 0.25 part of potassium carbonate was used instead of 0.40 part.

Procedure

The procedure under Example II was modified by lengthening the time of reflux to 3 hours to effect partially the effect of the decreased quantity of catalyst.

Product

The yield was 16.5 parts of resin. The resin was grindably hard, permanently fusible and had a capillary melting point of 145° F., a pH of 8.1 and a solids content of 95.25%.

EXAMPLE IV

Materials

The same as in Example III.

Procedure

The same as in Example III, with the exception that just prior to pouring the resin, the alkaline resin was neutralized. As has been stated, the neutralizing agent may advantageously be salicylic acid. The neutralizing acid is preferably stirred into the reaction mixture prior to pouring. The vacuum was then reapplied, and the heating continued for an additional ten minutes, at the end of which time the resin was poured.

Product

The yield of resin was 17 parts. The resin was grindably hard and permanently fusible, and had a melting point of 124° F., a pH of 6.1 and a solids content of 94.0%.

EXAMPLE V

Materials

| | Parts |
|---|---|
| Technical phenol (83% C₆H₅OH) (50% excess) | 23.04 |
| Furfural (1 mole) | 6.72 |
| Formaldehyde (1 mole) | 5.60 |
| Potassium carbonate | 0.45 |

Procedure

The foregoing reagents were mixed, refluxed for about 2 hours, and then dehydrated under a vacuum of 23 inches, ending up with a temperature of 350°–375° F. This temperature was maintained until a grindably hard resin was obtained (approximately 1¼ hours from the beginning of the dehydration step).

Product

The yield of resin was 20.39 parts. The resin was grindably hard and permanently fusible and had a solids content of 94.9%, a capillary tube melting point of 128° F. and pH of 9.0.

EXAMPLE VI

Materials

| | Parts |
|---|---|
| Technical phenol (83% C₆H₅OH) | 19.95 |
| Furfural (2 moles) | 7.686 |
| Formaldehyde (1 mole) | 3.20 |
| Potassium carbonate | 0.40 |

Procedure

The foregoing mixture of reagents was subjected to exactly the same processing as under Example V.

Product

A yield of 18.67 parts of a grindably hard, permanently fusible resin was obtained. The resin had a solids content of 95%, a capillary tube melting point of 120° F. and a pH of 9.05.

EXAMPLE VII

Materials

| | Parts |
|---|---|
| Technical phenol (83% C₆H₅OH) (50% excess) | 24.41 |
| Furfural (1 mole) | 4.80 |
| Formaldehyde (2 moles) | 8.00 |
| Potassium carbonate | 0.50 |

Procedure

The same as in Example V.

Product

The yield of resin was 23.87 parts. The resin possessed a solids content of 95.7%, a capillary tube melting point of 128° F. and a pH of 8.93. As in the previous examples, the resin was grindably hard and permanently fusible.

EXAMPLE VIII

Materials

The same as in Example VII.

Procedure

The procedure differed from that in Example V in that the dehydration or period of heating was prolonged to a point where a harder resin was obtained.

Product

A yield of 21 parts of a grindably hard, permanently fusible resin was obtained. The resin had a solids content of 97%, a capillary tube melting point of 172° F. and a pH of 9.02.

EXAMPLE IX

Materials

| | Parts |
|---|---|
| Technical phenol (92% C₆H₅OH) (about 50% excess) | 23.04 |
| Furfural (1 mole) | 6.72 |
| Formaldehyde (1 mole) | 5.60 |
| Potassium carbonate | 0.50 |

It will be seen that the materials differ from those in Example V in that 92% C₆H₅OH was used instead of 83%, and that 0.50 part of catalyst was used instead of 0.45 part.

Procedure

Exactly the same as in Example V.

Product 20.89 parts of resin were obtained, having a solids content of 96.9%, a capillary tube melting point of 155° F. and a pH of 9.38. The resin was grindably hard and permanently fusible.

EXAMPLE X

Materials

The same materials and proportions as in Example IX were employed with the exception that chemically pure phenol was used.

Procedure

The same as in Example V.

Product

The yield was 22.45 parts of a permanently fusible, grindably hard resin having a solids content of 94.32%, a capillary tube melting point of 125° F. and a pH of 9.2.

EXAMPLE XI

Materials

| | Parts |
|---|---|
| Technical cresol (about 50% excess) | 23.04 |
| Furfural (1 mole) | 6.72 |
| Formaldehyde (1 mole) | 5.60 |
| Potassium carbonate | 0.50 |

Procedure

The materials above specified are mixed and processed as in Example V, except that the charge was refluxed for about 2½ hours instead of two hours.

Product 26.19 parts of a grindably hard, permanently fusible resin were obtained. The solid content was 93%, and the melting point (capillary tube method) was 125° F. It is important to note that the resin was completely soluble in the usual siccative oils. The product of this example is, therefore, particularly suitable for the preparation of varnishes and other protective coatings.

EXAMPLE XII

Materials

| | Parts |
|---|---|
| Technical phenol (83% $C_6H_5OH$) (50% excess) | 20.37 |
| Furfural (1.75 moles) | 7.50 |
| Formaldehyde (1.00 mole) | 3.56 |
| Potassium carbonate | 0.50 |
| Salicylic acid | 0.80 |

Procedure

All the materials except the salicylic acid were mixed and processed as in Example V. The salicylic acid was added to the reaction mass after a sample indicated that it had reached the grindably hard stage. The heating was continued for a further period of five minutes at atmospheric pressure, and then for a still further period of ten minutes under a vacuum.

Product

The yield of resin averaged 20.25 parts. The resin had a solids content of 94.9%, a capillary melting point of 130° F. and a pH of 7.28, and was grindably hard and permanently fusible.

EXAMPLE XIII

Materials

| | Parts |
|---|---|
| Technical phenol (83% $C_6H_5OH$) (50% excess) | 20.37 |
| Furfural (1.75 moles) | 7.50 |
| Butylaldehyde (1.00 mole) | 3.21 |
| Potassium carbonate | 0.50 |

Procedure

The ingredients above listed were mixed and refluxed for about three hours. Then the mass was subjected to distillation at atmospheric pressure. When the distillation virtually ceased at a mass temperature of about 340° F., a vacuum was gradually applied until a vacuum of 23½ inches and a mass temperature of 375° F. were attained. The process was considered at an end when the distillation substantially ceased.

Product

A yield of 20.3 parts of resin was obtained, having a solids content of 97.1%, a capillary tube melting point of 162° F., and a pH of 9.46. As in the previous examples, the product was grindably hard and permanently fusible.

EXAMPLE XIV

Materials

| | Parts |
|---|---|
| Technical phenol (83% $C_6H_5OH$) (50% excess) | 20.37 |
| Furfural (1.75 moles) | 7.50 |
| Benzaldehyde (1.00 mole) | 4.74 |
| Potassium carbonate | 0.50 |

Procedure

Substantially the same as in Example XIII.

Product

The yield of resin was 19.05 parts. The resin had a solids content of 97%, a capillary melting point of 178° F. and a pH of 7.29, and was grindably hard. The resin was of the permanently fusible type.

EXAMPLE XV

Materials

| | Parts |
|---|---|
| Technical phenol (83% $C_6H_5OH$) (50% excess) | 20.37 |
| Furfural (1.75 moles) | 7.50 |
| Formaldehyde (1.00 mole) | 3.56 |
| Potassium carbonate | 0.50 |

Procedure

The mixture of the foregoing ingredients was refluxed for about two hours, and then the water and unreacted phenol were distilled off at atmospheric pressure until the distillation virtually ceased with a kettle temperature of about 375° F. A vacuum of about 25 inches was then gradually applied, the temperature being permitted to rise to 400° F. The process was considered at an end when virtually nothing more distilled over.

Product

The yield of resin was approximately 24 parts. The solids content was 94%, the capillary melting point was 113° F. and the pH was 9.45. The resin was grindably hard and permanently fusible.

EXAMPLE XVI

Materials

| | Parts |
|---|---|
| Technical phenol (83% C₆H₅OH) (50% excess) | 20.37 |
| Furfural (1.75 moles) | 7.50 |
| Formaldehyde (1.00 mole) | 3.56 |
| Potassium carbonate | 0.25 |

Procedure

The reaction mixture was refluxed for a period of about 3 hours. It was then subjected to distillation, first at atmospheric pressure, and then under vacuum.

Product

The resin obtained amounted to about 20.82 parts, and had a capillary melting point of 141° F., a solids content of 97.1% and a pH of 8.85. As in the previous examples, the resin was grindably hard and permanently fusible.

EXAMPLE XVII

Materials

| | Parts |
|---|---|
| Technical phenol (83% C₆H₅OH) (50% excess) | 20.37 |
| Furfural (1.75 moles) | 7.50 |
| Formaldehyde (0.50 mole) | 1.78 |
| Benzaldehyde (0.50 mole) | 2.37 |
| Potassium carbonate | 0.25 |

Procedure

The listed materials were mixed, refluxed for a period of three hours and then subjected to distillation with a jacket temperature of 375° F. at atmospheric pressure for as long as distillate came over. A vacuum of 23½ inches was then applied, and a small stream of air was passed into the kettle to facilitate the driving off of the volatiles including surplus phenol. Toward the end of the operation, the jacket temperature was stepped up to 400° F., the vacuum distillation being continued until a sample taken from the reaction mixture indicated that the product was grindably hard.

Product

The yield was 20.46 parts of a permanently fusible resin, the solids content was 96.5%, the capillary melting point was 195° F. and the pH was 9.71.

EXAMPLE XVIII

Materials

| | Parts |
|---|---|
| Technical phenol (83% C₆H₅OH) (50% excess) | 20.37 |
| Furfural (about 1.75 moles) | 7.50 |
| Methyl furfural (about 1.75 moles) | 2.00 |
| Formaldehyde (1 mole) | 3.56 |
| Potassium carbonate | 0.25 |

Procedure

The above mentioned substances were mixed, heated and refluxed for three hours, and then subjected to distillation first at atmospheric pressure and finally at reduced pressure (vacuum of 25 inches).

Product

The product was permanently fusible, grindably hard resin. The yield was 22.22 parts. The capillary tube melting point was 128° F. The solids content was 95.4%. The pH was 8.93.

EXAMPLE XIX

Materials

| | Parts |
|---|---|
| Technical phenol (92% C₆H₅OH) (50% excess) | 20.37 |
| Furfural (1.75 moles) | 7.50 |
| Formaldehyde (1.00 mole) | 3.56 |
| Potassium carbonate | 0.25 |
| Cashew nut shell liquid (defoamed by heat treatment) | 1.00 |

Procedure

All the above listed materials with the exception of the cashew nut shell liquid were mixed and refluxed for a period of three hours. The charge was then subjected to distillation at atmospheric pressure with a jacket temperature of 375° F. When the distillation virtually ceased, a vacuum of 23 inches was gradually applied. At the same time a stream of air was introduced to aid in distilling off the volatiles. The vacuum distillation was continued until distillate virtually ceased coming over, yielding a residuum of 20.5 parts. The cashew nut shell liquid was then added, and the vacuum distillation continued for another half hour with a jacket temperature of 375° F.

Product 21.46 parts of a grindably hard, permanently fusible resin were obtained. The resin had a solids content of 97.1%, a capillary tube melting point of 165° F., and a pH of 9.62.

EXAMPLE XX

Materials

| | Parts |
|---|---|
| Technical phenol (83% C₆H₅OH) | 12.95 |
| Furfural (1.75 moles) | 7.50 |
| Potassium carbonate | 0.16 |
| Technical phenol (83% C₆H₅OH) | 7.42 |
| Formaldehyde (1 mole) | 3.56 |
| Potassium carbonate | 0.09 |
| Cashew nut shell liquid (defoamed by heat treatment) | 1 |

Procedure

The mixture of phenol, furfural and potassium carbonate was refluxed for two hours. The mixture of phenol, formaldehyde and potassium carbonate was likewise refluxed for two hours. The two refluxed solutions were then mixed together and refluxed for another hour. The charge was then subjected to distillation at atmospheric pressure with a jacket temperature of 375° F. until the distillate ceased coming over. Then a vacuum of 23″ was gradually applied, while a stream of air was passed in. The vacuum distillation was continued until the distillation virtually stopped, yielding a residuum weighing about 20.5 parts. The cashew nut shell liquid was finally added, and the vacuum distillation continued for another half hour with a jacket temperature of 375° F.

Product

The yield was 21.51 parts of resin. The capillary melting point was 175° F., the solids content was 97.3% and the pH was 9.22.

The "solids content" referred to in the examples was determined by subjecting a weighed sample of the resin to a temperature of 220° F. for one hour, followed by a temperature of 320° F. for two hours, and then ascertaining the ratio that the final weight bears to the original weight. The capillary melting point and the pH were determined in the usual manner.

It is to be noted that in certain of the examples, technical phenol containing 83% C₆H₅OH was employed. The remaining constituents included about 8% of ortho cresol and 9% of meta cresol. In a few of the examples, technical phenol containing 92% C₆H₅OH and 8% cresol was used, and in one example (Example X) pure phenol was used. In Example XI technical cresol was used as the phenol, while in Example XIX two phenols were used, one being the shell liquid of the cashew nut.

In most of the examples, furfural (C₄H₃OCHO) was the furane aldehyde used. Furfural is preferred because it is the most readily available aldehyde of its class. In Example XVIII, methyl furfural was used in addition to the furfural.

In most of the examples, formaldehyde was the non-furane aldehyde used. The term "formaldehyde" as used in the examples has reference to the commercial aqueous solution containing about 37.5% of aldehyde by weight. Formaldehyde is preferred not only because of commercial considerations, but because its use results in resins having great ultimate physical strengths. In Example XIII, butylaldehyde was used instead of formaldehyde, in Example XIV benzaldehyde was used instead of formaldehyde, while in Example XVII both formaldehyde and benzaldehyde were used.

In Examples V, IX, X and XI the furane aldehyde and non-furane aldehydes are used in molar proportions. In Examples VI, XII, XIII, XIV, XV, XVI, XVII, XVIII and XIX the furane aldehyde is used in greater molar proportion than the non-furane aldehyde, whereas the situation is the opposite in Examples VII and VIII.

In all of the examples, potassium carbonate was used as the alkaline catalyst. This compound is preferred because it is particularly effective for the purpose. In Examples IV and XII, the alkaline catalyst is neutralized by means of salicylic acid.

It is also to be noted that in Examples XV to XVIII part of the dehydration step was carried out at atmospheric pressure. This procedure has the advantage of causing a more ready separation of the water from the phenol due to the fact that the bulk of the water and very little phenol is distilled off at atmospheric pressure. Furthermore, a higher temperature prevails within the reacting mass while the pressure is at or near atmospheric. This causes a further reaction, and results in a greater yield of resin.

To illustrate the importance of having an excess of phenol, Example I was repeated under exactly the same reaction conditions except that 100 parts of phenol instead of 150 parts were used. The reaction mixture turned to a gel-like rubbery mass and could not be brought to a grindably hard stage.

Example XVI was also repeated with 13.57 parts of phenol instead of 20.37 parts, all other conditions being kept the same. The reaction mass turned rubbery and infusible and could not be controlled so as to produce a grindably hard resin. In both cases, the resulting product was useless for applicants' intended purposes.

As has been stated, the products of the foregoing examples are resins of the Novolak or permanently fusible type. As such they are soluble in the usual solvents, e. g. acetone. They cannot of themselves be cured to a state of thermorigidity by means of heat, but they may readily be converted to resins of the thermosetting type by means of the so-called hardening agents such as hexamethylenetetramine (hexa), the various addition products of hexa such as mono-hexaoxalate or mono-hexa-phthalate, paraformaldehyde, furfuramide, formaniline, etc. with or without an acid catalyst. As examples of suitable catalysts may be mentioned salicylic acid, maleic acid, succinic acid, sebacic acid, polyhydric phenols such as resorcinol, hydroquinone, catechol, pyrogallol, etc. as well as inorganic substances such as ferric chloride which have acidic properties and substantially neutral substances which liberate acidic materials in the presence of water or on heating.

The following examples are given to illustrate the use of hardening agents:

EXAMPLE XXI

*Materials*

| | Parts |
|---|---|
| Product of any of the preceding examples | 100 |
| Hexamethylenetetramine (pulverized) | 10 |

*Procedure*

The materials above specified are thoroughly ground together as in a ball mill or other form of mixing apparatus.

EXAMPLE XXII

*Materials*

| | Parts |
|---|---|
| Product of any of Examples I to XX | 100 |
| Hexamethylenetetramine (aqueous solution) | 10 |

*Procedure*

The previously prepared resin is brought into contact with the hexa solution, and the excess solution is removed as by filtration or centrifuging. The resulting damp mass is dried at comparatively low temperatures.

EXAMPLE XXIII

*Materials*

| | Parts |
|---|---|
| Product of any of Examples I to XX | 100 |
| Hexamethylenetetramine (pulverized or in aqueous solution) | 10 |
| Acidic catalyst | 1 to 10 |

*Procedure*

The ingredients are well mixed as in Example XXI or XXII.

As has been stated, the normally thermoplastic type of resin produced in accordance with the teachings of this invention may be converted to the potentially reactive or thermosetting type. The products of the invention may be modified in many other ways, as by the incorporation during the manufacture or subsequently thereto of various reagents or modifying agents. For instance, we may include in the original reaction mixture, or we may add at any stage of the reaction as well as at the very end of the reaction just prior to pouring, any one or more of a large variety of materials such as alcohols, either monohydric or polyhydric, ketones, esters, resin, rosin derivatives such as ester gum or "Vinsol," pine oils, synthetic resins of the alkyd or phenolic type, etc. Such agents may be added for the purpose of altering the physical properties of the ultimate products such as their plasticity, elasticity, moldability, lubricating effect, flow and fluxing characteristics, moisture absorption, color, odor, etc.

It is also possible to incorporate into the product either during the processing or just prior to the pouring various dyestuffs, pigments, fillers, extending agents, plasticizers, lubricants, etc. In general, the resins of the invention may be treated and manipulated in much the same way as the conventional type of phenol-aldehyde resin.

The products of the invention are, as has been stated, phenolic inter-condensation resins. Hence, they are distinctively different from straight phenol-formaldehyde and straight phenol-furfural condensation products as well as from physical mixtures of these two types of products. At this point, it is to be noted that if a phenol-formaldehyde resin and a phenol-furfural resin in either powdered or molten state are mixed, no discernible reaction occurs and the product is nothing more than a simple physical admixture.

Among the characteristic distinguishing features of the products of the invention may be mentioned the following:

The inter-condensation resins are considerably lighter in color than mixtures of the straight phenol-formaldehyde and phenol-furfural resins. This is true not only of the initial products but also of the final infusible products. The inter-condensation resins when mixed with suitable hardening agents cure at a much slower rate than do the straight phenol-formaldehyde resins. The inter-condensation resins generally cure at a slower rate than do physical mixtures of phenol-furfural and phenol-formaldehyde resins of corresponding furfural content. Unlike the straight resins their rate of cure can be considerably speeded up by adding small quantities of an alkaline material such as lime, or small quantities of an acid such as salicylic. Hence, it is possible to control the rate of cure of inter-condensation resins within wide limits, and it is possible to obtain a resinous material characterized by either a high rate of cure for a given "flow" or by a high "flow" for a given rate of cure.

The difference between an inter-condensation resin of this invention and a physical mixture of phenol-formaldehyde and phenol-furfural resins of corresponding furfural content is strikingly illustrated by the fact that a 50–50 mixture of an inter-condensation resin with a physical mixture of phenolic resins utilizing hexamethylenetetramine as the hardening agent and an acidic accelerator cures to infusibility at an appreciably faster rate than that at which either type of resin will cure alone. The difference is considerably greater when benzaldehyde is used instead of formaldehyde in preparing the inter-condensation resin.

The inter-condensation resins of the invention may, generally speaking, be employed for any of the purposes for which the straight phenolic resins have been used. For example, they may be used for the preparation of molding compositions, impregnating agents, varnishes for laminating, protective coatings, etc. Products made in whole or in part of inter-condensation resins may be formed into various shapes or forms, such as sheets or webs, tubes, rods, etc. As specific examples of articles which may be made in whole or in part of the products of the invention may be mentioned frictional elements such as abrasive wheels, brake linings, sand paper, etc., and electrical insulation.

The inter-condensation resins may be added to or mixed with rubbery compositions or elastomers of either natural or synthetic origin. Thus, they may be mixed with either natural or synthetic rubbers to serve partly as fillers and partly as modifying agents, giving rise to ultimate vulcanizates having unique properties. We have found it possible to obtain ultimate vulcanizates, which in many respects resemble plasticized polyvinyl chloride plastics. By the admixture of the inter-condensation resins with oil-resistant butadiene copolymer synthetic rubbers, we have obtained ultimate products which are flexible and which possess great strength, toughness and oil resistance.

The invention has many advantages. As was stated, it has resulted in the production of a distinctively new and hitherto unknown class of synthetic resins. In this connection, it is to be noted that the invention renders it possible to utilize the higher homologues of formaldehyde. The inter-condensation resins have the decided advantage over straight phenol-furfural resins and straight phenol-formaldehyde resins in that the rate of cure can be controlled and can be speeded up to above the rate of cure of the straight resins. They have the advantage over the straight phenol-furfural resins in the fact that they are considerably lighter in color. They have the advantage over straight phenol-formaldehyde resins in that they utilize less formaldehyde, a material which has become of strategic importance. Furfural, being a product of vegetable origin and available in virtually unlimited quantities, is a much more economical aldehyde than formaldehyde.

Another advantage of the invention is in the matter of yield of product. By means of the invention, it is possible to obtain commercial yields of resin, when based upon total aldehyde consumption, that are considerably higher than those ordinarily obtained. Thus, by using sufficient alkaline catalyst, allowing ample time for refluxing and carrying out the forepart of the distillation or the bulk of the distillation at atmospheric or above atmospheric pressure, resin yields 5 to 10% higher than ordinarily obtained have been procured.

An added advantage of the invention is that it is possible to obtain substantial uniformity in product from run to run, and the danger of the resin going bad or over-reacting to the rubbery state is virtually eliminated.

In conclusion, it is to be noted that as indicated by the illustrative examples, many apparently widely different embodiments of the invention may be made without departing from the spirit thereof. For this reason, we wish it to be distinctly understood that we do not intend to limit ourselves to the specific examples, except as indicated in the appended claims or as required by the state of the prior art.

The present application is a continuation in part of application Serial No. 431,384 filed February 18, 1942, and now abandoned.

We claim:

1. The method of producing inter-condensation resins of the permanently fusible type, which comprises the steps of heat reacting a mixture containing a furane-aldehyde, a non-furane-aldehyde and a phenol in the presence of a substantially non-volatile inorganic alkaline catalyst, and in the absence of non-phenols which enter into ready reaction with aldehydes, said aldehydes being free of reactive susbtituents and being present in a molar furane-aldehyde to non-furane-aldehyde ratio of from 1:10 to 10:1 and the molar ratio of total phenol to total aldehydes being not less than 1.3:1 and not more than 1.75:1, and then distilling off volatiles, including water of reaction and excess phenol.

2. The method of producing inter-condensation resins of the permanently fusible type, which comprises the steps of heat reacting a mixture containing furfural, formaldehyde and a phenol in the presence of a substantially non-volatile inorganic alkaline catalyst, and in the absence of non-phenols which enter into ready reaction with aldehydes, said aldehydes being free of reactive substituents and being present in a molar furfural to formaldehyde ratio of from 1:10 to 10:1 and the molar ratio of total phenol to total aldehydes being not less than 1.3:1 and not more than 1.75:1, and then distilling off volatiles, including water of reaction and excess phenol.

3. The method of producing inter-condensation resins of the permanently fusible type, which comprises the steps of heat reacting a mixture containing furfural, butylaldehyde and a phenol in the presence of a substantially non-volatile inorganic alkaline catalyst, and in the absence of non-phenols which enter into ready reaction with aldehydes, said aldehydes being free of reactive substituents and being present in a molar furfural to butylaldehyde ratio of from 1:10 to 10:1 and the molar ratio of total phenol to total aldehydes being not less than 1.3:1 and not more than 1.75:1, and then distilling off volatiles, including water of reaction and excess phenol.

4. The method of producing inter-condensation resins of the permanently fusible type, which comprises the steps of heat reacting a mixture containing methyl furfural, formaldehyde and a phenol in the presence of a substantially non-volatile inorganic alkaline catalyst, and in the absence of non-phenols which enter into ready reaction with aldehydes, said aldehydes being free of reactive substituents and being present in a molar methyl furfural to formaldehyde ratio of from 1:10 to 10:1 and the molar ratio of total phenol to total aldehydes being not less than 1.3:1 and not more than 1.75:1, and then distilling off volatiles, including water of reaction and excess phenol.

5. An inter-condensation resin of the permanently fusible type made by the method which comprises the steps of heat reacting a mixture containing a furane-aldehyde, a non-furane-aldehyde and a phenol in the presence of a substantially non-volatile inorganic alkaline catalyst, and in the absence of non-phenols which enter into ready reaction with aldehydes, said aldehydes being free of reactive substituents and being present in a molar furane-aldehyde to non-furane-aldehyde ratio of from 1:10 to 10:1 and the molar ratio of total phenol to total aldehydes being not less than 1.3:1 and not more than 1.75:1 and then distilling off volatiles, including water of reaction and excess phenol.

6. An inter-condensation resin of the permanently fusible type made by the method which comprises the steps of heat reacting a mixture containing furfural, formaldehyde and a phenol in the presence of a substantially non-volatile inorganic alkaline catalyst, and in the absence of non-phenols which enter into ready reaction with aldehydes, said aldehydes being free of reactive substituents and being present in a molar furfural to formaldehyde ratio of from 1:10 to 10:1 and the molar ratio of total phenol to total aldehydes being not less than 1.3:1 and not more than 1.75:1, and then distilling off volatiles, including water of reaction and excess phenol.

7. An inter-condensation resin of the permanently fusible type made by the method which comprises the steps of heat reacting a mixture containing furfural, butylaldehyde and a phenol in the presence of a substantially non-volatile inorganic alkaline catalyst, and in the absence of non-phenols which enter into ready reaction with aldehydes, said aldehydes being free of reactive substituents and being present in a molar furfural to butylaldehyde ratio of from 1:10 to 10:1 and the molar ratio of total phenol to total aldehydes being not less than 1.3:1 and not more than 1.75:1, and then distilling off volatiles, including water of reaction and excess phenol.

8. An inter-condensation resin of the permanently fusible type made by the method which comprises the steps of heat reacting a mixture containing methyl furfural, formaldehyde and a phenol in the presence of a substantially non-volatile inorganic alkaline catalyst, and in the absence of non-phenols which enter into ready reaction with aldehydes, said aldehydes being free of reactive substituents and being present in a molar methyl furfural to formaldehyde ratio of from 1:10 to 10:1 and the molar ratio of total phenol to total aldehydes being not less than 1.3:1 and not more than 1.75:1, and then distilling off volatiles, including water of reaction and excess phenol.

ERNEST E. NOVOTNY.
GEORGE K. VOGELSANG.

REFERENCES CITED

The following references are of record in the file of this patent:

UNITED STATES PATENTS

| Number | Name | Date |
|---|---|---|
| 1,592,296 | Ellis | July 13, 1926 |
| 1,710,722 | Cherry et al. | Apr. 30, 1929 |
| 1,771,508 | Novotny | July 29, 1930 |
| 1,793,715 | Novotny | Feb. 24, 1931 |

FOREIGN PATENTS

| Number | Country | Date |
|---|---|---|
| 668,952 | Germany | Dec. 13, 1938 |